2,881,176

COMPLEXES OF 2-HEPTADECYLIMIDAZOLINES

John N. Hogsett, Charleston, W. Va., assignor to Union Carbide Corporation, a corporation of New York No Drawing. Application March 11, 1957
Serial No. 644,977

9 Claims. (Cl. 260—299)

This invention relates to complexes of 2-heptadecylimidazolines and to a process for their preparation. More particularly, this invention relates to chelates of 2-heptadecylimidazolines, as new compositions of matter and to a process for their preparation.

I have discovered that novel chelates of 2-heptadecylimidazolines are formed by reacting a metallic compound with a 2-heptadecylimidazoline.

An embodiment of the present invention is a class of new compositions of matter which are chelates formed by reacting a metallic salt with a 2-heptadecylimidazoline. A specific chelate, which is illustrative of this embodiment of my invention is di(2-heptadecylimidazoline acetic acid) copper II sulfate ($C_{44}H_{88}O_8N_4SCu$) which can be represented by the structural formula:

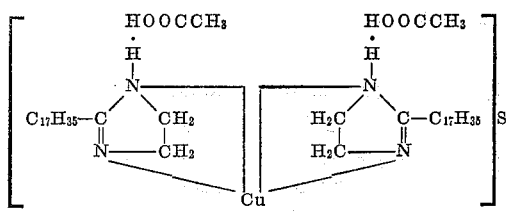

Di(2-heptadecylimidazoline acetic acid) copper II sulfate, $C_{44}H_{88}O_8N_4SCu$ These compositions include the chelates formed by reacting 2-heptadecylimidazoline with the salts of the metals of group I of the periodic table. Illustrative of such chelates are: diheptadecylimidazoline silver nitrate, diheptadecylimidazoline copper salicylate and diheptadecylimidazoline copper sulfate.

My compositions also include chelates formed by reacting the acid salts of 2-heptadecylimidazoline with the salts of the metals of group I of the periodic table. Illustrative of such chelates are: di(heptadecylimidazoline acetic acid) sodium sulfate, di(heptadecylimidazoline acetic acid) sodium hypophosphate, di(heptadecylimidazoline acetic acid) silver nitrate, di(heptadecylimidazoline acetic acid) copper salicylate and di(heptadecylimidazoline acetic acid) copper sulfate.

The chelates of my invention can also be formed by reacting 2-heptadecylimidazoline with the salts of the metals of group II of the periodic table. Illustrative of such chelates are: diheptadecylimidazoline zinc nitrate, diheptadecylimidazoline zinc chloride, diheptadecylimidazoline cadmium sulfate, diheptadecylimidazoline cadmium nitrate, diheptadecylimidazoline mercury sulfate and diheptadecylimidazoline mercury bromide.

My chelates also include those formed by reacting the acid salts of 2-heptadecylimidazoline with the salts of the metals of group II of the periodic table. Illustrative of such chelates are: di(heptadecylimidazoline acetic acid) magnesium sulfate, di(heptadecylimidazoline acetic acid) magnesium chloride, di(heptadecylimidazoline acetic acid) zinc chloride, di(heptadecylimidazoline acetic acid) cadmium sulfate, di(heptadecylimidazoline acetic acid) cadmium nitrate, di(heptadecylimidazoline acetic acid) mercury sulfate and di(heptadecylimidazoline acetic acid) mercury bromide.

The compositions of my invention also include the chelates formed by reacting 2-heptadecylimidazoline with the salts of the metals of group III of the periodic table. Illustrative of such chelates are: triheptadecylimidazoline aluminum sulfate, triheptadecylimidazoline aluminum nitrate and triheptadecylimidazoline aluminum chloride.

My compositions also include chelates formed by reacting acid salts of 2-heptadecylimidazoline with the salts of the metals of group III of the periodic table. Illustrative of such chelates are: tri(heptadecylimidazoline acetic acid) aluminum sulfate, tri(heptadecylimidazoline acetic acid) aluminum nitrate and tri(heptadecylimidazoline acetic acid) aluminum chloride.

The compositions of my invention also include the chelates formed by reacting 2-heptadecylimidazoline with the salts of the metals of group IV of the periodic table. Illustrative of such chelates is diheptadecylimidazoline lead nitrate.

Still other compositions within the scope of my invention are the chelates formed by reacting the acid salts of 2-heptadecylimidazoline with the salts of the metals of group IV of the periodic table. Illustrative of such chelates is di(heptadecylimidazoline acetic acid) lead nitrate.

Other compositions within the scope of my invention are the chelates formed by reacting 2-heptadecylimidazoline with the salts of the metals of group VI of the periodic table. Illustrative of such chelates are: triheptadecylimidazoline chromium sulfate, triheptadecylimidazoline chromium nitrate and triheptadecylimidazoline chromium chloride.

Still other compositions of my invention are the chelates formed by reacting the acid salts of 2-heptadecylimidazoline with the salts of the metals of group VI of the periodic table. Illustrative of such chelates are: tri(heptadecylimidazoline acetic acid) chromium sulfate, tri(heptadecylimidoazoline acetic acid) chromium nitrate and tri(heptadecylimidazoline acetic acid) chromium chloride.

Other compositions within the scope of my invention are the chelates formed by reacting 2-heptadecylimidazoline with the salts of the metals of group VII of the periodic table. Illustrative of such chelates are: diheptadecylimidazoline manganese nitrate, diheptadecylimidazoline magnesium chloride and diheptadecylimidazoline manganese sulfate.

The compositions of my invention also include chelates formed by reacting the acid salts of 2-heptadecylimidazoline with the salts of the metals of group VII of the periodic table. Illustrative of such chelates are: di(heptadecylimidazoline acetic acid) manganese nitrate, di(heptadecylimidazoline acetic acid) manganese chloride and di(heptadecylimidazoline acetic acid) manganese sulfate.

Another group of compositions within the scope of my invention are the chelates formed by reacting 2-heptadecylimidazoline with the salts of the metals of group VIII of the periodic table. Illustrative of such chelates are: triheptadecylimidazoline iron sulfate, triheptadecylimidazoline iron phosphate, triheptadecylimidazoline iron nitrate, triheptadecylimidazoline cobalt sulfate and diheptadecylimidazoline nickel nitrate.

Still another group of compositions within the scope of my invention are the chelates formed by reacting the acid salts of 2-heptadecylimidazoline with the salts of the metals of group VIII of the periodic table. Illustrative of such chelates are: tri(heptadecylimidazoline acetic acid) iron sulfate, tri(heptadecylimidazoline acetic acid) iron phosphate, tri(heptadecylimidazoline acetic acid) iron nitrate, tri(heptadecylimidazoline acetic acid)

cobalt sulfate and di(heptadecylimidazoline acetic acid) nickel nitrate.

Other compositions within the scope of my invention are the chelates formed by reacting 2-heptadecylimidazoline with the salts of the metals of the lanthanum series of the periodic table. Illustrative of such chelates is tri(heptadecylimidazoline) cerium acid sulfate.

Still other compositions within the scope of my invention are the chelates formed by reacting the acid salts of 2-heptadecylimidazoline with the salts of the metals of the lanthanum series of the periodic table. Illustrative of such chelates is tri(heptadecylimidazoline acetic acid) cerium acid sulfate.

The compounds of the present invention can be prepared by a process which comprises bringing a 2-heptadecylimidazoline into reactive admixture with a metal salt under conditions to produce a chelate.

The metal salts which are best suited for use in this invention are water-soluble. For this reason, the reaction should be conducted in a solvent medium which comprises at least 80 percent water. Other solvents which can be used together with water are methanol, ethanol, isopropanol and pyridine. The two reactants, namely the 2-heptadecylimidazoline and the metal salt, need not be added to the solvent in any particular order. Preferably, however, in the case of 2-heptadecylimidazoline, the metal salt is dissolved in water and the 2-heptadecylimidazoline is dissolved in an alcohol, such as isopropanol, and the two solutions are combined. In the case of 2-heptadecylimidazoline acetic acid, both reactants are preferably dissolved in water.

The reaction is preferably conducted at 20 to 30° C. but can be conducted at temperatures between about 0° C. and about 80° C.

The following examples are illustrative:

EXAMPLE I

Di(2-heptadecylimidazoline acetic acid) copper II sulfate ($C_{44}H_{88}O_8N_4SCu$) was prepared as follows:

About 6.3 grams of anhydrous cupric sulfate ($CuSO_4$) were dissolved in 3000 ml. of water and the solution was agitated at a slow rate. To this solution was added, dropwise over a period of 15 minutes, 100 ml. of water and the solution was agitated at a slow rate. To this solution was added, dropwise over a period of 15 minutes, 100 ml. of an isopropanol solution containing 29 grams of dissolved acetic acid salt of 2-heptadecylimidazoline. A precipitate formed and was filtered at reduced pressure in a large Büchner funnel. The precipitate was washed twice with water and vacuum dried at 50° C. and 5 mm. Hg for about 24 hours. The dried precipitate had a melting point of 159° C. The calculated percentage composition for a 100 percent pure compound and the actual composition (by weight) found for the copper II chelate prepared as described above are compared in Table I. In Table I, R is 2-heptadecylimidazoline acetic acid.

Table I
PERCENTAGE COMPOSITION OF DI(2-HEPTADECYLIMIDAZOLINE ACETIC ACID) COPPER II SULFATE

| Element | Calculated, Percent Composition 2R to 1 $CuSO_4$ | Found, Percent Composition |
| --- | --- | --- |
| C | 58.9 | 58.8 |
| H | 9.9 | 10.8 |
| O | 14.3 | 11.6 |
| N | 6.2 | 6.2 |
| Cu | 7.1 | 6.0 |
| S | 3.6 | 4.2 |

The data obtained agree satisfactorily with the theoretical structure of the copper II chelate containing 2 moles of 2-heptadecylimidazoline acetic acid per mole of copper, in accordance with the accepted coordinate number of 4 for $Cu^{++}$.

EXAMPLE II

Di(2-heptadecylimidazoline acetic acid) copper II salicylate ($C_{58}H_{98}O_{14}N_4Cu$) was prepared using the same procedure as in Example I, except that 25 grams of anhydrous cupric salicylate ($Cu(C_7H_5O_3)_2$) were used instead of 6.3 grams of anhydrous copper sulfate. The dried precipitate which was formed had a melting point of 51–53° C. The calculated percent pure compound and the actual composition (by weight) found for the copper II chelate prepared as described above are compared in Table II. In Table II, R is 2-heptadecylimidazoline acetic acid.

Table II
PERCENTAGE COMPOSITION OF DI(2-HEPTADECYLIMIDAZOLINE ACETIC ACID) COPPER II SALICYLATE

| Element | Calculated, Percent Composition 2R to 1 $Cu(C_7H_5O_3)_2$ | Found, Percent Composition |
| --- | --- | --- |
| C | 64.8 | 68.5 |
| H | 9.2 | 9.8 |
| O | 14.9 | 10.4 |
| N | 5.2 | 6.1 |
| Cu | 5.9 | 3.4 |

The data obtained agree satisfactorily with the theoretical structure of the copper II chelate containing 2 moles of 2-heptadecylimidazoline acetic acid per mole of copper, in accordance with the accepted coordinate number of 4 for $Cu^{++}$.

EXAMPLE III

Di(2-heptadecylimidazoline) copper II sulfate ($C_{40}H_{82}O_6N_4SCu$)

was prepared using the same procedure as in Example I, except that 30 grams of 2-heptadecylimidazoline were used in place of the 29 grams of 2-heptadecylimidazoline acetic acid and 15.6 grams of anhydrous copper sulfate ($CuSO_4$) were used in place of the 6.3 grams of anhydrous copper sulfate. The dried precipitate which was formed had a melting point of 154–156° C. The calculated percent pure compound and the actual composition (by weight) found for the copper II chelate prepared as described above are compared in Table III. In Table III, R' is 2-heptadecylimidazoline.

Table III
PERCENTAGE COMPOSITION OF DI(2-HEPTADECYLIMIDAZOLINE) COPPER II SULFATE

| Element | Calculated, Percent Composition 2R' to 1 $CuSO_4$ | Found Percent Composition |
| --- | --- | --- |
| C | 61.9 | 60.5 |
| H | 10.4 | 10.2 |
| O | 8.2 | 8.3 |
| N | 7.2 | 5.7 |
| Cu | 8.2 | 10.5 |
| S | 4.1 | 3.0 |

The data obtained agree satisfactorily with the theoretical structure of the copper II chelate containing 2 moles of 2-heptadecylimidazoline per mole of copper, in accordance with the accepted coordinate number of 4 for $Cu^{++}$.

EXAMPLE IV

Di(2-heptadecylimidazoline) silver nitrate $C(_{40}H_{82}ON_5Ag)$ was prepared using the same procedure as in Example I, except that 30 grams of 2-heptadecylimidazoline were used in place of the 29 grams of 2-heptadecylimidazoline acetic acid and 16.6 grams of silver nitrate ($AgNO_3$) were used instead of the 6.3 grams of copper sulfate. The dried precipitate which was formed had a melting point of 74–76° C. The calculated percent pure compound and the actual composition (by weight) found for the zinc II chelate prepared as described above are compared in Table IV. In Table IV, R' is 2-heptadecylimidazoline.

Table IV

PERCENTAGE COMPOSITION OF DI(2-HEPTADECYLIMIDAZOLINE) SILVER NITRATE

| Element | Calculated, Percent Composition 2R' to 1 $AgNO_3$ | Found, Percent Composition |
|---|---|---|
| C | 61.0 | 56.8 |
| H | 10.2 | 9.7 |
| O | | |
| N | 8.9 | 7.8 |
| Ag | 13.7 | 16.0 |

The data obtained agree satisfactorily with the theoretical structure of the silver chelate containing 2 moles of 2-heptadecylimidazoline per mole of silver, in accordance with the accepted coordinate number of 4 for $Ag^+$.

The other chelates of this invention can be prepared in a similar manner.

As disclosed in copending Torgeson application, Serial No. 545,107, filed November 4, 1955, the chelates of this invention are useful as fungicides. Representative chelates contemplated herein were tested for fungicidal activity by means of the slide germination test. Essentially this test method consisted of germinating spores in continual contact, on glass slides, with given concentrations of the chemical under test. The germination was observed after 24 hours and the amount of the chemical needed to inhibit germination of 50% (L.D. 50 value) of the spores was determined. The procedure used is more fully set forth in a paper entitled "The Slide-Germination Method of Evaluating Protectant Fungicides," published in Phytopathology, July 1943, vol. XXXIII, No. 7, pp. 627–632. Two different and typical fungi were used for this test. The fungi tested were Sclerotinia fructicola (Wint.) Rehm (S.f.) and Alternaria oleraceae (A.o.). The values in Table V below represent the parts by weight of the chelate under test, in a million parts by weight of liquid, to prevent the germination of 50% of the spores. The liquid used, which of itself did not inhibit germination of the spores, was Lin's solution, which consists of 10 grams of dextrose, 2.46 grams of $MgSO_4 \cdot 7H_2O$ and 100 ml. of distilled water. Ten milliliters of this solution were added to each 100 milliliters of spore.

Table V

| Compound | $LD_{50}$ in parts per million | |
|---|---|---|
| | S.f. | A.o. |
| Di(heptadecylimidazoline acetic acid) sodium sulfate | .31–.62 | 1.25–2.5 |
| Di(heptadecylimidazoline acetic acid) cadmium chloride | .31–.62 | 2.5–5 |
| Tri(heptadecylimidazoline acetic acid) aluminum sulfate | .62–1.25 | 2.5–5 |
| Tri(heptadecylimidazoline acetic acid) chromium nitrate | .31–.62 | 5–10 |
| Di(heptadecylimidazoline acetic acid) manganese chloride | .62–1.25 | 2.5–5 |
| Tri(heptadecylimidazoline acetic acid) ferric sulfate | .31–.62 | 2.5–5 |
| Triheptadecylimidazoline iron sulfate | .62–1.25 | 5–10 |
| Diheptadecylimidazoline zinc chloride | .62–1.25 | 5–10 |

The periodic table referred to in this application is the periodic table of the elements revised in accordance with the Journal of the American Chemical Society, volume 76, page 2033 (1954).

This application is a continuation-in-part of my copending application, Serial No. 545,108, filed November 4, 1955, now Patent No. 2,789,115.

I claim:

1. A chelate having the structural formula $MR_n$, wherein R is a member selected from the group consisting of 2-heptadecylimidazoline and acid salts thereof, M is both the anion and cation of an inorganic salt of a metal of group I of the periodic table and $n$ is an integer having a value of one-half the coordination number of said metal.

2. A chelate having the structural formula $MR_n$, wherein R is 2-heptadecylimidazoline, M is both the anion and cation of an inorganic salt of a metal of group I of the periodic table and $n$ is an integer having a value of one-half the coordination number of said metal.

3. A chelate having the structural formula $MR_n$, wherein R is an acid salt of 2-heptadecylimidazoline, M is both the anion and cation of an inorganic salt of a metal of group I of the periodic table and $n$ is an integer having a value of one-half the coordination number of said metal.

4. A chelate having the structural formula $MR_n$, wherein R is 2-heptadecylimidazoline acetic acid, M is both the anion and cation of an inorganic salt of a metal of group I of the periodic table and $n$ is an integer having a value of one-half the coordination number of said metal.

5. Di(2-heptadecylimidazoline acetic acid) copper sulfate.

6. Di(2-heptadecylimidazoline acetic acid) copper nitrate.

7. Di(2-heptadecylimidazoline acetic acid) silver nitrate.

8. Di(2-heptadecylimidazoline) copper sulfate.

9. Di(2-heptadecylimidazoline) copper nitrate.

References Cited in the file of this patent

UNITED STATES PATENTS

| 2,155,877 | Waldmann et al. | Apr. 25, 1939 |
| 2,540,171 | Kiff | Feb. 6, 1951 |
| 2,789,115 | Hogsett | Apr. 16, 1957 |

FOREIGN PATENTS

| 531,297 | Germany | Aug. 7, 1931 |

OTHER REFERENCES

Klingenstein: Ber. Deut. Chem., vol. 28, pp. 1175–76 (1895).